April 5, 1938. C. J. YOUNG 2,113,165
SYNCHRONOUS MOTOR SPEED CONTROL MEANS
Filed Sept. 28, 1935
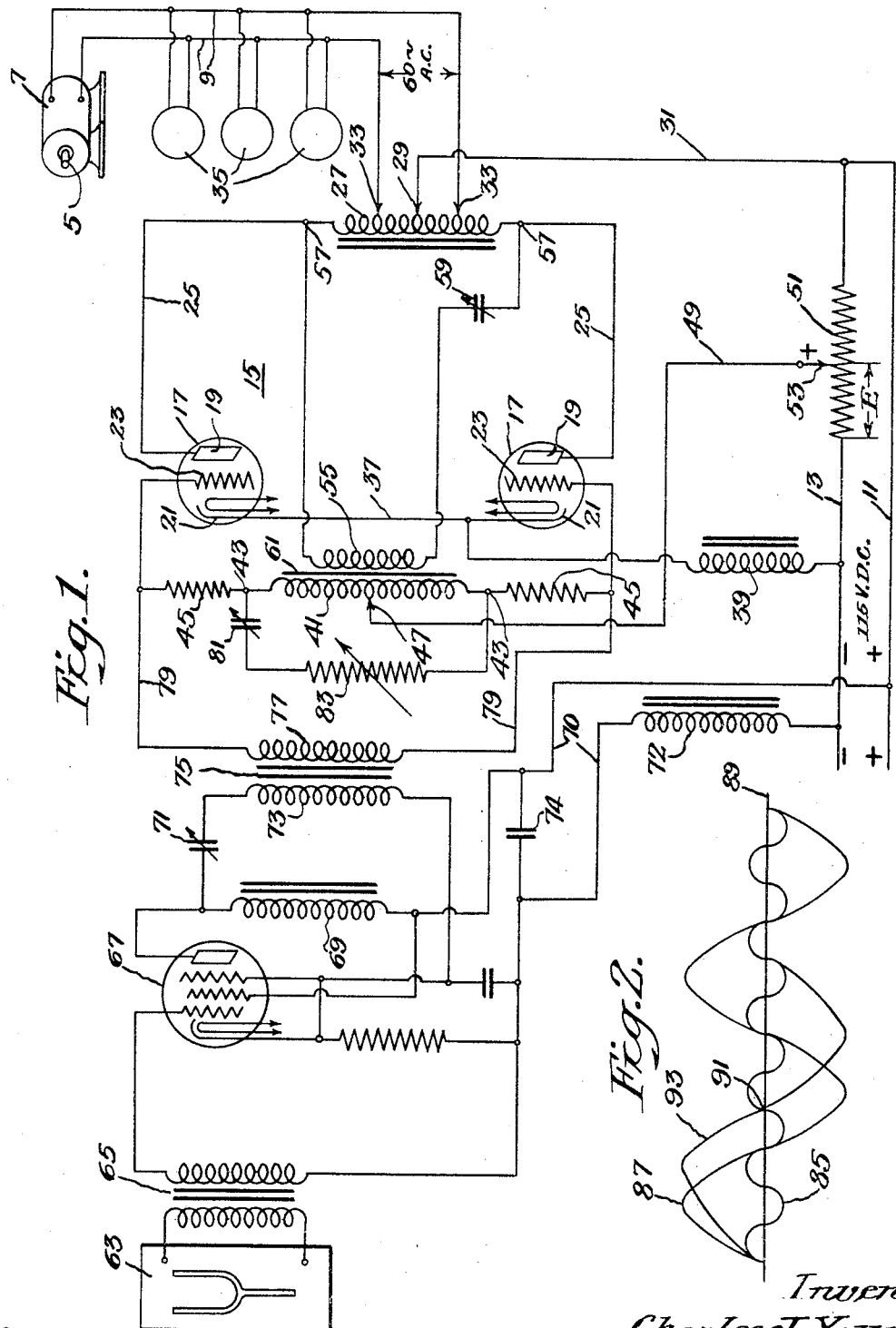
Inventor
Charles J. Young
by [signature]
Attorney.

Patented Apr. 5, 1938

2,113,165

UNITED STATES PATENT OFFICE 2,113,165

SYNCHRONOUS MOTOR SPEED CONTROL MEANS

Charles J. Young, Haverford, Pa., assignor to Radio Corporation of America, a corporation of Delaware Application September 28, 1935, Serial No. 42,628

9 Claims. (Cl. 172—292)

The present invention relates to synchronous motor speed control means, and has for its object to provide means for obtaining precise speed control of a rotating shaft from a fixed frequency standard or source of fixed frequency, whereby a plurality of exact synchronous speeds may be obtained without the intermediary of a mechanical gear shift means in connection with said rotating shaft.

The invention has its present application in connection with the driving mechanism for facsimile transmitting the receiving apparatus where precise speeds are necessary.

The invention has the advantage that a plurality of differing speeds may be obtained which are based upon and are a sub-multiple of a fixed standard controlling frequency which may be supplied by any suitable means, such as a tuning fork oscillator.

In carrying out the invention, a rotating shaft is synchronized with a source of fixed oscillations as provided by an electrically driven tuning fork for example, by utilizing a frequency dividing oscillatory circuit in connection with a controllable electric discharge inverter.

It is, therefore, a further object of the invention to provide an improved inverter system, the output frequency of which may be adjusted to predetermined values under control of a fixed frequency source.

The invention will, however, be better understood from the following description, when considered in connection with the accompanying drawing, and its scope will be pointed out in the appended claims.

In the drawing, Fig. 1 is a schematic circuit diagram of a synchronous motor speed control system embodying the invention, and Fig. 2 is a series of curves illustrating the mode of operation of the system of Fig. 1.

Referring to Fig. 1, 5 is a rotary shaft which it is desired to operate at a plurality of different predetermined speeds. For this purpose, the shaft is synchronously driven and, in the present example, is illustrated as the shaft of a synchronous motor 7 connected with supply mains 9 which receive energy from a direct current source represented by positive and negative supply mains 11 and 13 through an electric discharge inverter 15.

The inverter comprises a pair of electric discharge devices 17 arranged in balanced relation to each other in connection with balanced input and output circuits. The electric discharge devices 17 are controllable rectifiers and are preferably of the electro-statically controlled arc rectifier type. Such rectifier devices are commercially available and well known on the commercial market as Thyratrons. These devices each comprise an anode 19, a hot cathode 21, and a grid 23. As is well known, the grid may be biased to prevent the starting of anode current but is ineffective to stop the flow of anode current. Any suitable gas discharge device of this type adapted for use as a rectifier or inverter with a control grid may be used.

A balanced output circuit for the devices 17 is indicated at 25—25 and includes a balanced output choke coil or auto transformer 27 having a center tap 29 connected through a positive anode supply lead 31 with a positive direct current supply main 11. The alternating current power output circuit 9 for the motor 7 is connected with tap 33 on opposite sides of the center tap 29 on the output choke coil or transformer 27. As shown, the device 27 provides a step down auto transformer between the anode circuit of the rectifier or inverter and the load circuit 9. Other synchronous devices such as electric timing devices and the like may be connected to the load circuit 9 as indicated at 35.

The cathodes 21 are connected together by a lead 37 which, in turn, is connected through a choke coil 39 with the negative direct current supply main 13, thereby completing the balanced anode circuit for the inverter.

The inverter input circuit comprises an inductance 41, having terminals 43 connected through series impedance devices 45 with the control grids 23. The inductance 41 is provided with a center tap 47 provided with a connection lead 49 for bias control means comprising a potentiometer resistor 51 connected in shunt relation with the direct current supply means 11 and 13 and having a movable tap 53 connected with the lead 49.

It will be seen that with this arrangement a positive biasing potential "E" with respect to cathode is placed upon the control grids 23, which potential may be adjusted by a movement of the contact 53 along the potentiometer 51. It will be seen that a balanced input circuit is provided comprising each half of the inductance 41 and the series impedances 45 with a cathode return to the bias supply means 51—53 and the choke coil 39. A choke coil 39 is, therefore, located adjacent to the cathodes in both the input and the output circuits of the inverter, and its function will hereinafter be referred to.

The inversion frequency is supplied by a feed back winding 55 connected across the terminals 57 of the output impedance 27 through a series capacitor 59. The feed back winding 55 is inductively coupled with the input winding 41 of the inverter, as indicated, and may comprise the primary winding of a transformer, the core of which is indicated at 61.

In the present example, the step-up ratio is substantially 1 to 50 and the winding 55 is therefore of relatively low impedance. The circuit arrangement in connection with the feed back winding 55 is such that the capacitor 59 serves to tune the inverter output winding 27 to the output or inverter frequency which may be chosen at 60 cycles and may be variable as shown. The inverter is therefore of the self-oscillating type and serves to supply, by well known inverter action an alternating current at 60 cycles to the load circuit 9 from the direct current supply mains 11 and 13. The starting of the inverter is adjusted by the contact 53 and is dependent upon the characteristics of the tubes in use.

An alternating potential of a frequency which is a multiple of the chosen inverter frequency is applied to the control grids 23 along with the alternating potential supplied by the inverter oscillatory circuit from a potential source of fixed frequency such as an electrically driven tuning fork oscillator represented at 63. The output potential of the oscillator 63 is applied with a coupling transformer 65 to an electric discharge amplifier 67 having an output coupling choke coil 69.

The amplifier may be of any suitable type and receives anode potential from the mains 11 and 13 through supply leads 70 provided with a filter choke coil 72 and by-pass capacitor 74. The output choke coil 69 and the output circuit of the amplifier 67 is coupled through a coupling capacitor 71 with the primary 73 of an input transformer 75. The secondary 77 of the input transformer is connected directly between the control grids 23 of the balanced inverter through leads 79.

In the present example, the tuning fork oscillator 63 through the amplifier 67 is arranged to supply an alternating potential to the control grid 23 at a frequency of 480 cycles, the chosen 60 cycle frequency of the inverter being a sub-multiple of that frequency. The tuned circuit represented by the coupling capacitor 71 and the primary winding 73 of the inverter controlling frequency input circuit is tuned to pass currents of 480 cycles and to reject any 60 cycle feed back from the grids 23 to the amplifier 67. Likewise, the impedances 45 serve to isolate the inverter oscillatory circuit from the frequency control system and thus to prevent it from loading the frequency control system. With a supply potential limited to the low voltages from the mains 11 and 13, the power output of the amplifier 67 is limited. Therefore, it is desirable to prevent excessive loading of the control system, otherwise the output therefrom may be reduced below the limit of effective control of the rectifier.

In the present example, the series impedances between the control grids of the inverter rectifier devices and the inverter oscillatory circuit are preferably resistors as shown and the oscillatory circuit is tunable by a tuning capacitor 81 connected in shunt relation to the oscillatory input circuit inductance 41 through a variable series resistor 83. The capacitor 81 is of such value that by changing the value of the resistor 83 over its range of control, the oscillatory circuit of the inverter is responsive to a plurality of differing frequencies about the mean frequency of 60 cycles.

The self-excitation of the inverter through the feed back connection and the two impedances 45 is adjusted by a proper effective resistance value of said impedances to reduce the self-excitation to a point where the inverter locks in step with the controlling frequency supplied by the oscillator 63. The resistors or impedances therefore serve to prevent the inverter tubes from oscillating too strongly and to prevent the tubes from drawing too much grid current. The main function, however, is to isolate the inverter oscillatory circuit from the controlling frequency input circuit sufficiently to permit the controlling frequency therefrom to lock the inverter in step with it.

It has been found that by adjusting the resistor 83 and the effectiveness of the capacitor 81 in the oscillatory circuit, the inverter may operate at a plurality of sub-multiple frequencies relative to the controlling frequency, and that the operation changes abruptly from one sub-multiple frequency to the other progressively as the resistor 83 is varied. For example, in practice, effective and continuous steady operation is obtainable from a 480 cycle controlling frequency with an output frequency of 60, 68.57, 80, 96, and 120 cycles from the inverter, being the 8th, 7th, 6th, 5th and 4th sub-multiple of the 480 cycle controlling frequency.

It will thus be seen that by varying the resistor 83 progressively the shaft 5 may be caused to rotate at synchronous speed corresponding to 60 cycles or a plurality of other differing fixed synchronous speeds.

The controlling frequency tends to lock in the inverter frequency, as shown in Fig. 2. In this figure alternating components of the grid potential are shown, the 480 cycle wave, being indicated at 85, producing an odd sub-multiple, such as a 160 cycle wave, indicated at 87. In this case, both waves increase from and decrease toward the zero voltage line 89 in the same direction and the push pull or balanced inverter therefore locks easily in step with a controlling frequency, when the inverter frequency is an odd sub-multiple.

The current flow in the choke coil 39 in the cathode lead produces a double frequency with respect to the inverter frequency at a relatively high potential. This has been found to aid in locking in the inverter when operating at an even sub-multiple of the controlling frequency. The choke coil provides a potential in proper phase relation to the controlling potential, to overcome the condition as indicated at 91 in Fig. 2, when an even sub-multiple potential, represented by the wave 93, is derived from the inverter. It will be seen that at the point 91, the two waves are in opposition, and this opposition will occur in the grid or inverter input circuit, which is common to the choke coil 39. The potential existing across the choke coil tends to maintain the inverter in operation through the zero change-over point 91.

From the foregoing description, it will be seen that a rotatable shaft may be synchronized with an electrically driven tuning fork or other source of constant or standard frequency, by utilizing a frequency dividing oscillatory circuit in connection with a controllable electric discharge inverter of the full wave type, wherein the controlling and inverter oscillatory circuits are substantially isolated by series impedances.

It will be seen that the present system has the advantage that it does not require the usual regulator means for the shaft driving device, such as motor control circuits, field regulation circuits and the like, and obviates the necessity for friction brake types of speed control, which are wasteful of energy. Furthermore, the system does not require additional amplifier and control tubes, but merely utilizes the power inverter tubes which are required to supply the power to the load circuit. In any event, the system provides in effect an electrical gear shift means providing a plurality of different speeds, each of which is a synchronous speed, fixed by the single frequency control means, which may be of the type employed as a frequency standard and is therefore non-variable. Such control means is of importance in connection with fascimile recorders which must operate at a synchronous speed.

The system as shown and described has the further advantage that an inverter circuit employing a pair of electrostatically controlled arc rectifiers of the Thyratron type may be arranged not only as an inverter for supplying alternating current power from a direct current source but may be utilized as a frequency divider for supplying that power at fixed sub-multiple frequencies with respect to a fixed controlling frequency without the use of complicated additional apparatus, and with only sufficient amplification of the controlling potential to actuate the grids of the inverter system.

I claim as my invention:

1. In combination, a full wave electrical power inverter providing alternating current power output of a predetermined frequency, motor means operable in connection therewith at a synchronous speed in accordance with said frequency, means providing a variable impedance frequency determining circuit for said inverter, means for applying an alternating controlling potential to said inverter at a higher frequency which is a multiple of said predetermined output frequency, and means for preventing the frequency determining circuit of the inverter from loading said last named means, whereby the speed of the motor may be varied by varying the impedance of said frequency determining circuit.

2. The combination with a rotatable shaft, of a power supply system for driving said shaft at a plurality of fixed speeds, comprising in combination, synchronous alternating current motor means for driving said shaft, an electrostatically controlled arc rectifier inverter having an input circuit and an output load circuit connected with said motor to supply power thereto, means for variably tuning said inverter, means providing an alternating current controlling potential at a frequency of which the inverter frequency is a sub-multiple, means for coupling said last named means to said inverter, and means for partially isolating said last named means from the inverter input circuit, whereby the inverter output frequency may vary in fixed predetermined steps in response to said variable tuning.

3. A combination with a rotatable shaft, of a power supply system for driving said shaft at a plurality of fixed speeds, comprising in combination, synchronous alternating current motor means for driving said shaft, an inverter including a pair of electrostatically controlled arc-rectifier devices each having a control electrode and having an output load circuit connected with said motor means to supply power thereto, means providing a tunable frequency determining circuit for said inverter, means providing an alternating current controlling potential at a frequency of which the inverter frequency is a sub-multiple, means for coupling said last named means to said inverter control electrodes, and impedance means for isolating to a predetermined degree said coupling means from the inverter tunable circuit and said control electrodes, whereby the inverter frequency determining circuit may be tuned to provide power output at differing fixed frequencies.

4. A system in accordance with claim 3, further characterized by the fact that said last named impedance means includes an impedance device interposed between the frequency determining circuit and each of the control electrodes of said rectifier devices.

5. A system in accordance with claim 3, further characterized by the fact that a series choke coil is included in circuit with the control electrodes of said rectifier devices and with the output load circuit thereof.

6. A system in accordance with claim 3, further characterized by the fact that the last named coupling means is provided with a tuned circuit for passing currents at the controlling frequency and preventing feed back from the inverter.

7. A system in accordance with claim 3, further characterized by the fact that the last named coupling means is provided with a tuned circuit for passing currents at the controlling frequency and preventing feed back from the inverter, and that the inverter is provided with a feed back circuit for producing self-oscillations, said feed back circuit being tunable to the inverter frequency and a sub-multiple of the controlling frequency.

8. A system for varying the speed of a rotatable shaft under control of a potential at a fixed frequency, comprising a synchronous electric motor for driving said shaft, an inverter for transforming direct current power into alternating current power for said motor, said inverter comprising a pair of balanced grid controlled arc rectifier devices having a frequency determining input circuit initially tuned to a sub-multiple of said fixed frequency and a power output circuit coupled to said motor, a circuit for supplying oscillations to said frequency determining circuit from said output circuit, a potential source of fixed frequency oscillations, means for coupling said inverter rectifier devices to said source to pass a controlling potential thereto at a higher multiple of the inverter frequency, and a pair of series impedances between said frequency determining circuit and the oscillator coupling means, whereby the inverter circuit is controllable to respond to a plurality of sub-multiple frequencies with respect to the controlling frequency, thereby to vary the power output frequency and the speed of said shaft.

9. A system in accordance with claim 8, further characterized by the fact that said frequency determining input circuit is provided with means for varying the tuning thereof comprising a tuning capacitor, and a series resistor for controlling said tuning capacitor thereby to operate said inverter selectively in predetermined steps through a plurality of sub-multiple frequencies related to the fixed controlling frequency.

CHARLES J. YOUNG.